US00RE45878E

(19) United States
(12) Reissued Patent
Nowell et al.

(10) Patent Number: US RE45,878 E
(45) Date of Reissued Patent: Feb. 2, 2016

(54) WORKPIECE SUPPORTING ASSEMBLY

(71) Applicant: Flow Valve LLC, Sulphur, OK (US)

(72) Inventors: Mark S. Nowell, Ardmore, OK (US); Guy J. Lapointe, Sulphur, OK (US)

(73) Assignee: FLOW VALVE LLC, Sulphur, OK (US)

(21) Appl. No.: 14/328,490

(22) Filed: Jul. 10, 2014

Related U.S. Patent Documents

Reissue of:
(64) Patent No.: 8,215,213
Issued: Jul. 10, 2012
Appl. No.: 12/479,391
Filed: Jun. 5, 2009

(51) Int. Cl.
*B23B 5/36* (2006.01)
*B23B 25/00* (2006.01)
*B23B 31/00* (2006.01)

(52) U.S. Cl.
CPC ..... *B23B 25/00* (2013.01); *B23B 31/00* (2013.01); *Y10T 82/2593* (2015.01); *Y10T 82/27* (2015.01)

(58) Field of Classification Search
CPC ..... B23B 25/00; B23B 25/31; Y10T 82/27; Y10T 82/2593
USPC ..... 82/162, 170, 172, 104, 150, 151; 279/133, 152, 142, 145, 143; 269/9
See application file for complete search history.

(56) References Cited

U.S. PATENT DOCUMENTS

| | | | | | |
|---|---|---|---|---|---|
| 663,325 | A | * | 12/1900 | Blamire | 279/112 |
| 3,180,188 | A | | 4/1965 | Brown | |
| 3,682,491 | A | | 8/1972 | Sakazaki et al. | |
| 3,967,816 | A | * | 7/1976 | Ramsperger et al. | 269/9 |
| 4,102,105 | A | | 7/1978 | Taylor et al. | |
| 4,151,984 | A | * | 5/1979 | Zapart | 269/9 |
| 4,352,500 | A | | 10/1982 | Blattry et al. | |
| 4,595,186 | A | | 6/1986 | Reed et al. | |
| 4,738,171 | A | | 4/1988 | Link et al. | |
| 4,781,083 | A | | 11/1988 | Cummings | |
| 4,872,691 | A | | 10/1989 | Rohm | |
| 4,999,894 | A | | 3/1991 | Berry et al. | |
| 5,768,962 | A | | 6/1998 | Link et al. | |
| 5,906,341 | A | * | 5/1999 | Brown | 248/49 |
| 7,337,700 | B2 | | 3/2008 | Bono et al. | |
| 2009/0102109 | A1 | * | 4/2009 | Nuchter et al. | 269/71 |

* cited by examiner

*Primary Examiner* — William Doerrler
(74) *Attorney, Agent, or Firm* — Hall Estill Attorneys at Law

(57) ABSTRACT

A workpiece supporting assembly, having a body member with an internal workpiece channel and a plurality of body openings communicating with the internal workpiece channel, supports a workpiece within the workpiece channel so that end portions of the workpiece extend from the body openings. The body member has a plurality of arbors, each arbor having a longitudinal axis that is coincident with a datum axis of one of the extending workpiece portions. A turning machine grips one arbor at a time and rotates the body member about the selected longitudinal axis for machining the extended workpiece portion.

20 Claims, 3 Drawing Sheets

WORKPIECE SUPPORTING ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF INVENTION

The present invention relates to metal shaping and machining devices, and more particularly but not by way of limitation, to an assembly for supporting a multi-face workpiece in workpiece machining implement such as a turning machine.

DISCUSSION

Many pipe fittings, such as pipe elbows and swivel joints, are manufactured by bending straight pipes, often at advanced temperatures, to a required length and angular extension. For such fittings of the type that are to be made up with other pipe sections or the like by means of threaded connections, one or more ends of the fittings require machining in a turning machine, such as a lathe, to form threads or to form seat surfaces.

Typically such pipe fittings are supported in a holding fixture such as a lathe chuck and rotated while a cutting tool is manipulated into cutting or polishing engagement to achieve the required shape of the fitting end. Commonly, multiple spindles supporting different working tools are mounted in a CNC lathe and the fitting is machined one end at a time, with the pipe fitting being supported in a different orientation by chucks to position each fitting end appropriately for machining in sequence. This often requires multiple chucks capable for each fitting to achieve the required orientation while accommodating the turning machine requirements.

It would be advantageous to provide a multi-purpose holding fixture that would serve to expedite the machining of the pipe fittings to minimize machine setup time while optimizing the integrity of the machining operation.

SUMMARY OF INVENTION

The present invention provides a workpiece supporting assembly having a body member with an internal workpiece channel and a plurality of body openings communicating with the internal workpiece channel. A workpiece is supported within the workpiece channel so that end portions of the workpiece extend the body openings. A plurality of arbors extend from the body member, each arbor having an axis coincident with a datum axis of one of the extending workpiece portions. A turning machine grips one of the arbors at a time and rotates the supporting assembly about the selected axis for machining the extended workpiece portion.

The nature, principle and utility of the invention will be made apparent from the following detailed description when read in conjunction with the accompanying drawings and appended claims.

BRIEF DESCRIPTION OF THE DRAWINGS

For an understanding of the embodiment of the invention described herein, reference is made to the following detailed description of the invention which is to be read in conjunction with the accompanying drawings, wherein.

DESCRIPTION

Figure 1:
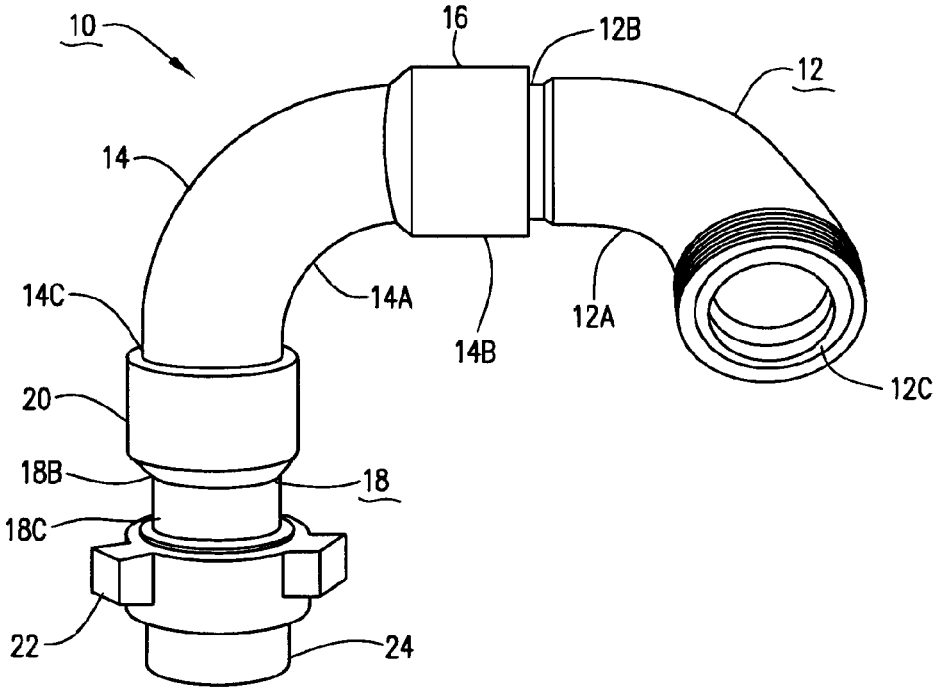
FIG. 1 is a perspective view of a swivel joint assembly having components that can be machined by the present invention.

The present invention provides a workpiece supporting assembly capable of supporting a variety of workpieces, but will be illustrated in its application to the finish machining of the ends of an elbow member. Turning to the drawings, and in particular to FIG. 1, there is illustrated a conventional fitting, a swivel joint assembly 10, that has components that require fabrication by a turning machine. The swivel assembly 10 has a pair of elbow members 12 and 14, each of which has a 90 degree bend in the medial portion 12A and 14A, respectively. A first swivel joint 16 is formed by the joinder of a male end 12B of the elbow member 12 and a female end 14B, a plurality of ball bearings being disposed in internal grooves to accommodate rotation of the elbow member 12 with respect to the elbow member 14.

Similarly, an opposing male end 14C of the elbow member 14 is joined with a female end 18B of a pipe member 18 to form a second swivel joint 20, a plurality of ball bearings being disposed in internal grooves to accommodate rotation of the elbow member 14 with respect to the member 18. An opposing end 18C of the member 18 has a make-up collar 22, with externally extending hammer knobs, for threadingly engaging a threaded male end of a typical conduit joint 24.

Figure 2:
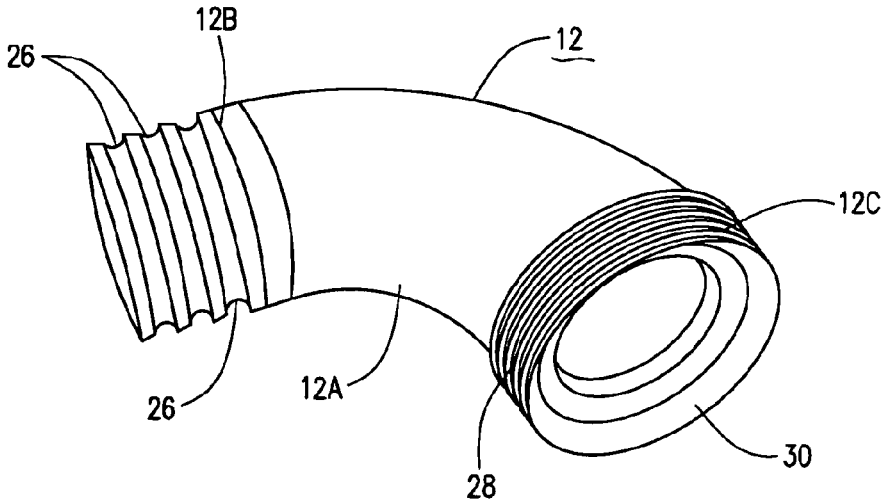
FIG. 2 is a perspective view of an elbow component of the swivel joint assembly of FIG. 1.
Figure 3:
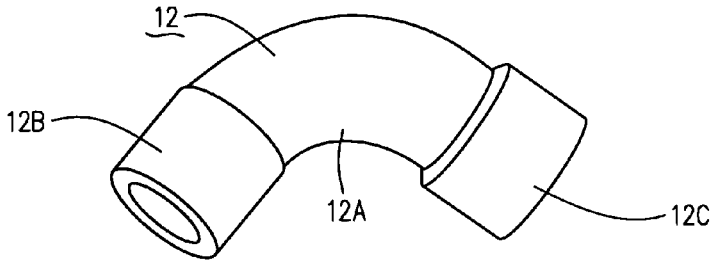
FIG. 3 is a perspective view of the elbow member of FIG. 2 in an unfinished condition.

FIG. 2 shows an enlarged view of the elbow member 12 in order to illustrate the ring grooves 26 in the end 12B, and threads 28 and beveled seat surface 30 in end 12C thereof. It will be recognized by persons skilled in the art that while the elbow member 12 can be bent by the application of external force to create the bend at its medial portion 12A, the precision features at its ends 12B and 12C, that is, the ring grooves 26, the threads 28 and the seat surface 30, require machining such as by a lathe. The view in FIG. 3 shows the elbow member 12 prior to this machining; that is, the ends 12B and 12C of the elbow member 12 have yet to be machined to form the ring grooves 26, threads 28 and seat surface 30.

Figure 4:
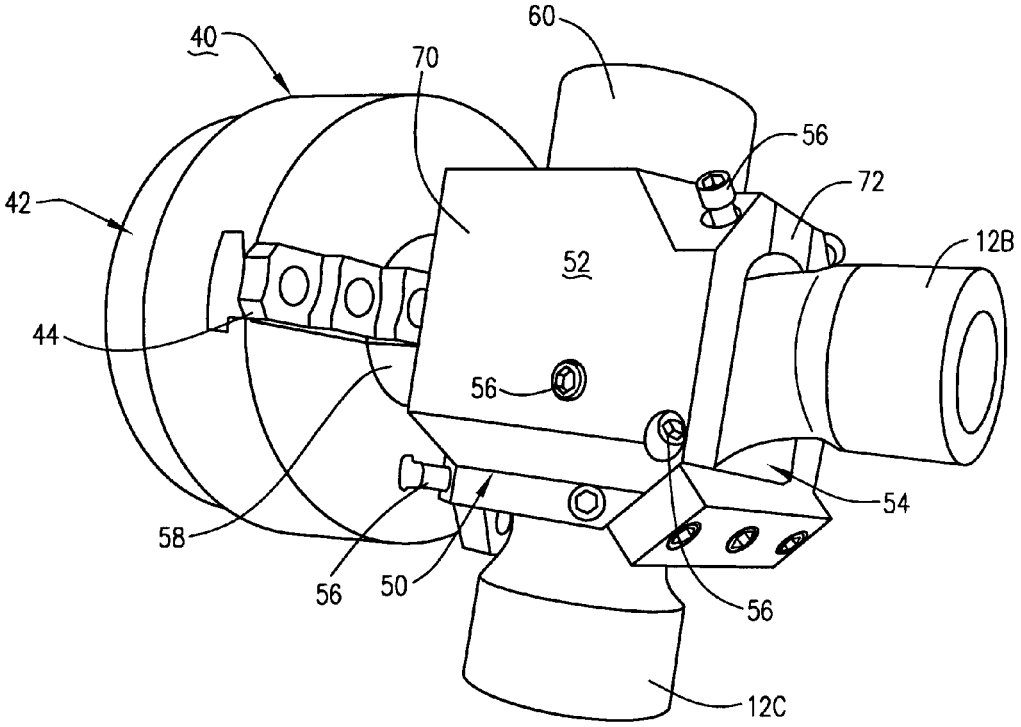
FIG. 4 is a perspective view of a workpiece machining implement supporting a workpiece supporting assembly constructed in accordance with the present invention.
Figure 5:
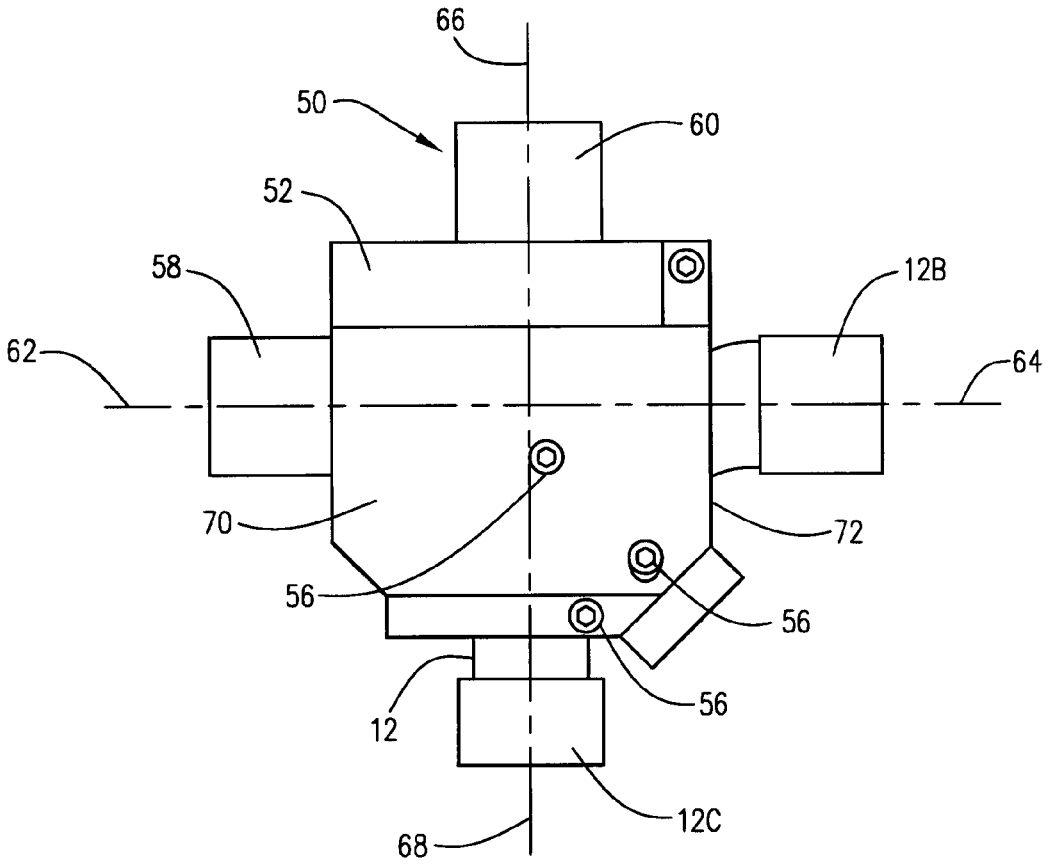
FIG. 5 is a side elevational view of the workpiece supporting assembly of FIG. 4.

In FIG. 4 a workpiece machining implement 40 is shown as having a lathe chuck 42 that is rotatable by a conventional motor and shaft arrangement (not shown) that are believed to be well known and need not be described in further detail herein. The chuck 42 is of the type having three or more gripping jaw members 44 (only one shown) that are movable toward each other by a turning key wrench to grip an item placed in between the jaws. Shown in FIGS. 4 and 5 is a workpiece supporting assembly 50 in which is mounted a workpiece, namely, the unfinished elbow 12 having its ends 12B and 12C extending therefrom.

The workpiece supporting assembly 50 has a body member 52 that forms an internal channel 54 that is configured to rigidly support the elbow 12, which in this example is the workpiece to be worked upon by the workpiece machining implement 40. Several support adjustment bolts 56 (only some of which are shown) are positioned about the body member 52 in threaded bores that communicate with the internal channel 54 so that the bolts disposed therein extend into the internal channel 54 so as to press against the medial portion 12A of the elbow 12, and upon tightening, the adjustment bolts 56 will secure the elbow 12 therein for operation upon by a cutting or polishing tool (not shown).

The body member 52 provides body openings that communicate with the internal channel 54 so that extending workpiece portions (the ends 12B, 12C) extend from the body openings. Further, the body member 52 has a first arbor 58 and a second arbor 60 supported to extend from the body member 52. The first arbor 58 is positioned so that the longitudinal axis 62 thereof is coincident with the datum or central axis 64 of the extending elbow end 12B so that, when workpiece machining implement 40 rotates the chuck 42, the first arbor 58 is rotated about its longitudinal axis 62, the body member 52 will rotate the elbow end 12B about the datum axis 64 thereof.

In like manner, the second arbor 60 is positioned so that the longitudinal axis 66 thereof is coincident with the datum or central axis 68 of the extending elbow end 12C. Thus, by removing the body member 52 from the chuck 42, with the elbow 12 still secured in the internal channel of the body member 52, and placing the second arbor 60 in the chuck 42, rotation of the second arbor 60 and the body member 52 about the longitudinal axis 66 of the second arbor 60 will rotate the elbow end 12C about its datum axis 68.

The body member 52 comprises a pair of side plates 70 and end plates 72 that are joined via screw members (not shown) and serve as a housing to form the internal channel 54. Threaded bores are readily made at appropriately spaced apart locations to support the treaded adjustment bolts 56 that are dimensioned to extend into the channel 54. The openings of the channel 54 are determined to permit placing the workpiece, which is in the embodiment illustrated, the elbow member 12, and once the ends 12B, 12C extend an appropriate distance, the adjustment bolts 56 are tightened against the elbow member so as to secure it therein. A simple machine set up is made so that the datum axes 64, 68 align to coincide with the longitudinal axes 62, 66, respectively.

Thus, the multiple arbors of the workpiece supporting assembly provides means for machining the ends of the unfinished elbow member 12 by a single setup and only a change from one arbor to one of the other arbors allows rapid and accurate machining of the workpiece in a machine turning machine. That is, the ring grooves 26 on the end 12B and the external threads 28 on the end 12C, as well as the seats, of the elbow member 12 can be machined by the workpiece machining implement such as illustrated as a conventional lathe.

It is clear that the present invention is well adapted to carry out the objects and to attain the ends and advantages mentioned as well as those inherent therein. While presently preferred embodiments of the invention have been described in varying detail for purposes of the disclosure, it will be understood that numerous changes may be made which will readily suggest themselves to those skilled in the art and which are encompassed within the spirit of the invention disclosed and as defined in the above text and in the accompanying drawings.

What is claimed is:

1. A workpiece machining implement comprising:

a workpiece supporting assembly comprising:

a body member having an internal workpiece channel, the body member having a plurality of body openings communicating with the internal workpiece channel;

means supported by the body member for positioning a workpiece in the internal workpiece channel so that extending workpiece portions of the workpiece extend from selected ones of the body openings;

a plurality of arbors supported by the body member, each arbor having an axis coincident with a datum axis of one of the extending workpiece portions; and means for rotating the workpiece supporting assembly about the axis of a selected one of the arbors.

2. The workpiece machining implement of claim 1 wherein the body member comprises side plates and end plates and means for connecting said plates to form the workpiece channel.

3. The workpiece machining implement of claim 1 wherein the means for positioning comprises a plurality of adjustment bolts supported by the body member to extend into the workpiece channel.

4. The workpiece machining implement of claim 1 wherein the *means for* rotating comprises a chuck.

5. An implement for machining a multiple datum axis workpiece, comprising:

a body member having a workpiece channel;

a plurality of arbors supported by the body member, each arbor having an axis, the workpiece supportable in the workpiece channel so that each of the workpiece datum axes is coincident with one of the arbor axes;

means for rotating a selected one of the arbors so that the workpiece is rotated about a selected one of the workpiece axes.

6. The workpiece machining implement of claim 5 wherein the body member comprises side plates and end plates and means for connecting said plates to form the workpiece channel.

7. The workpiece machining implement of claim 5 further comprising a plurality of adjustment bolts supported by the body member to extend into the workpiece channel to position and secure a workpiece in the workpiece channel.

8. The workpiece machining implement of claim 5 wherein the means for rotating the arbors is a lathe chuck.

9. A workpiece supporting assembly comprising:

a body member having an internal workpiece channel, the body portion having a plurality of body openings communicating with the internal workpiece channel;

means supported by the body member for positioning a workpiece in the internal workpiece channel so that extending workpiece portions of the workpiece extend from selected ones of the body openings; and a plurality of arbors supported by the body member, each arbor having an axis coincident with a datum axis of one of the extending workpiece portions.

10. The assembly of claim 9 further comprising:

means for rotating the workpiece supporting assembly about the axis of a selected one of the arbors.

11. The assembly of claim 9 wherein the body member comprises side plates and end plates and means for connecting said plates to form the workpiece channel.

12. The workpiece machining implement of claim 9 wherein the means for positioning comprises a plurality of adjustment bolts supported by the body member to extend into the workpiece channel to position and secure the workpiece.

13. The workpiece machining implement of claim 10 wherein the rotating comprises a lathe chuck.

*14. A workpiece supporting assembly for securing an elbow during a machining process that is performed on the elbow by operation of a workpiece machining implement, the workpiece supporting assembly comprising:*

*a body having an internal surface defining a channel, the internal surface sized to receive a medial portion of the elbow when the elbow is operably disposed in the channel; and*

*a support that is selectively positionable to secure the elbow in the workpiece supporting assembly, the body pivotable to a first pivoted position, the body sized so that a first end of the elbow extends from the channel and beyond the body so the first end of the elbow is presentable to the workpiece machining implement for performing the machining process, the body pivotable to a second position and sized so that a second end of the elbow extends from the channel beyond the body so the second end of the elbow is presentable to the workpiece machining implement for performing the machining process.*

*15. The workpiece supporting assembly of claim 14 wherein the support comprises an adjustment bolt supported by the housing member to extend into the workpiece channel.*

*16. A workpiece supporting assembly for rigidly supporting an elbow during a machining process that is performed on the elbow by a workpiece machining implement, the workpiece supporting assembly comprising:*

*a body having an internal surface defining a channel, the internal surface sized to receive a medial portion of the elbow when the elbow is operably disposed in the channel; and*

*a support adjustment bolt threadingly engaged with the body and selectively positionable to urge the medial portion of the elbow against the internal surface, the body sized so that each end of the elbow extends from the channel and beyond the body so that each end of the elbow is presentable to the workpiece machining implement for performing the machining process after securing the elbow and before removing the secured elbow from the workpiece supporting assembly.*

*17. A workpiece supporting assembly for securing an elbow during a machining process that is performed on the elbow by operation of a workpiece machining implement, the workpiece supporting assembly comprising:*

*a body having an internal surface defining a channel, the internal surface sized to receive a medial portion of the elbow when the elbow is operably disposed in the channel; and*

*a support that is selectively positionable to operably urge the medial portion of the elbow against the internal surface to thereby secure the elbow in the workpiece supporting assembly, the body selectively positionable to a first position where a datum axis of one end of the secured elbow is operably aligned with the workpiece machining implement, and the body alternatively positionable to a different second position where a datum axis of the other end of the secured elbow is operably aligned with the workpiece machining implement.*

*18. A method for securing an elbow during a machining process that is performed on the elbow by operation of a workpiece machining implement, the method comprising:*

*obtaining a workpiece supporting assembly having an internal surface defining a channel, the internal surface sized to receive a medial portion of the elbow;*

*placing the elbow in the channel;*

*positioning a support to operably secure the elbow in the workpiece supporting assembly, the body sized so that each end of the elbow extends from the channel and beyond the body so that each end of the elbow is presentable to the workpiece machining implement for performing the machining process;*

*after the positioning a support, positioning the workpiece supporting assembly to a first position to align a datum axis of one end of the elbow with the workpiece machining implement and performing the machining process for the one end of the elbow;*

*after the positioning the workpiece supporting assembly to a first position, positioning the workpiece supporting assembly to a different second position to align a datum axis of the other end of the elbow with the workpiece machining implement and performing the machining process for the other end of the elbow; and*

*after the performing the machining process for the other end of the elbow, removing the secured elbow from the workpiece supporting assembly.*

*19. A method for machining an elbow having first and second ends, comprising:*

*placing the elbow into a channel on a body of a workpiece supporting assembly so that first and second ends of the elbow extend beyond the channel;*

*securing the elbow against at least a portion of an inner surface of the channel using a support that engages the body;*

*performing a first machining operation on the first end of the elbow;*

*positioning at least a portion of the workpiece supporting assembly;*

*performing a second machining operation on the second end of the elbow; and*

*removing the elbow from the workpiece supporting assembly.*

*20. A workpiece supporting assembly for securing an elbow during machining of first and second ends of the elbow by a workpiece machining implement, comprising:*

*a body having a channel therein for receiving the elbow, whereby the first and second ends of the elbow extend from the channel;*

*a support that engages the body and secures the elbow in the channel, the body positionable between a first position for machining the first end of the elbow by the workpiece machining implement and a second position for machining the second end of the elbow by the workpiece machining implement.*

* * * * *